(12) United States Patent
Zhou et al.

(10) Patent No.: US 9,042,638 B2
(45) Date of Patent: May 26, 2015

(54) IMAGE MATCHING METHOD AND STEREO MATCHING SYSTEM

(71) Applicant: NOVATEK Microelectronics Corp., Hsin-Chu (TW)

(72) Inventors: Lei Zhou, Shanghai (CN); Guangzhi Liu, Shanghai (CN); Cheng-Wei Chou, New Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 48 days.

(21) Appl. No.: 14/033,515

(22) Filed: Sep. 22, 2013

(65) Prior Publication Data

US 2015/0010230 A1    Jan. 8, 2015

(30) Foreign Application Priority Data

Jul. 4, 2013 (CN) .......................... 2013 1 0279902

(51) Int. Cl.
*G06K 9/00* (2006.01)

(52) U.S. Cl.
CPC ........ *G06K 9/00536* (2013.01); *G06K 9/00201* (2013.01)

(58) Field of Classification Search
None
See application file for complete search history.

(56) References Cited

U.S. PATENT DOCUMENTS

| | | | |
|---|---|---|---|
| 8,437,536 B2 * | 5/2013 | Saito .............................. | 382/154 |
| 2004/0252863 A1 * | 12/2004 | Chang et al. ................... | 382/104 |
| 2004/0252864 A1 * | 12/2004 | Chang et al. ................... | 382/104 |
| 2006/0221072 A1 * | 10/2006 | Se et al. ......................... | 345/420 |
| 2010/0040279 A1 * | 2/2010 | Yoon et al. ..................... | 382/153 |
| 2011/0199465 A1 * | 8/2011 | Barenbrug et al. ............. | 348/54 |
| 2012/0139902 A1 * | 6/2012 | Fujisawa et al. ............... | 345/419 |
| 2012/0163703 A1 * | 6/2012 | Lim et al. ....................... | 382/154 |
| 2012/0182401 A1 * | 7/2012 | Kobayashi et al. ............. | 348/51 |
| 2013/0010073 A1 * | 1/2013 | Do et al. ......................... | 348/46 |
| 2013/0027513 A1 * | 1/2013 | Corral-Soto ................... | 348/43 |
| 2013/0113892 A1 * | 5/2013 | Nakamaru ...................... | 348/47 |
| 2013/0129148 A1 * | 5/2013 | Nanri et al. .................... | 382/103 |
| 2013/0136340 A1 * | 5/2013 | Ogura ............................. | 382/154 |
| 2013/0222550 A1 * | 8/2013 | Choi et al. ...................... | 348/47 |
| 2013/0278631 A1 * | 10/2013 | Border et al. .................. | 345/633 |
| 2014/0036043 A1 * | 2/2014 | Shibazaki et al. .............. | 348/49 |
| 2014/0064604 A1 * | 3/2014 | Jiang et al. ..................... | 382/154 |
| 2014/0232820 A1 * | 8/2014 | Ha et al. ......................... | 348/43 |

* cited by examiner

*Primary Examiner* — Randolph I Chu

(74) *Attorney, Agent, or Firm* — Winston Hsu; Scott Margo

(57) ABSTRACT

An image matching method is utilized for performing a stereo matching from a first image block to a second image block in a stereo matching system. The image matching method includes performing a matching computation from the first image block to the second image block according to a first matching algorithm to generate a first matching result; performing the matching computation between the first image block and the second image block according to a second matching algorithm to generate a second matching result and a third matching result; obtaining a matching error and a matching similarity of the first image block according to the second matching result and the third matching result; and determining a stereo matching result of the first image block according to the matching error and the matching similarity.

22 Claims, 4 Drawing Sheets

IMAGE MATCHING METHOD AND STEREO MATCHING SYSTEM

BACKGROUND OF THE INVENTION

1. Field of the Invention

The present invention relates to an image matching method and a stereo matching system, and more particularly, to an image matching method and a stereo matching system capable of selecting an accurate stereo matching result according to an object characteristic of an image.

2. Description of the Prior Art

With continuously progressing image technologies, sizes and functionalities of display devices are increasingly diverse. In order to meet requirements of the different consumers, manufacturers of the display devices try to provide new products with better outputting performance and resolution. One of the most interesting products is a display device with three-dimensional display functionality. General three-dimensional display technologies include polarized, interlaced or anaglyph display methods. These display methods utilize special optical structures to project images with different views corresponding to depth information on human left and right eyes. Thus, the human left and right eyes may respectively capture the images with different views to be synthesized by the human brain, and the human may sense a three-dimensional image.

When two-dimensional images without the depth information are displayed by the display device having the three-dimensional display functionality, since the source images for displaying lack the depth information, the display device may not generate multi-views images corresponding to the depth information to be projected on the human left and right eyes. Under such a condition, the display device is required to analyze the two-dimensional images to obtain the depth information, so as to display the multi-views images. In the prior art, at least two images with different views are required to be obtained first by utilizing multiples image capture devices located in different locations, and the depth information may be analyzed from the at least two images with different views. A process for analyzing two images with different views to obtain the depth information is called stereo matching. In the stereo matching, matching objects (or characteristics, pixels, etc.) are searched first between the two images with different views to obtain positional differences of the matching objects in the two images with different views. The positional differences are disparity information (or can be called a disparity map) of the two images, and the depth information of the matching objects may be calculated by the disparity information.

However, when the stereo matching is performed between the two images with different views for obtaining the depth information, since landscapes of the two images are not entirely the same and the two images with different views may be captured by the two image capture devices with different distances from each other, how to accurately search the matching objects between the two images with different views to obtain the accurate disparity information may affect accuracy of the depth information. For example, when a matching error of an object between the two images is occurred, such as object A of a left-view image is matched to object B of a right-view image rather than object A of the right-view image, the disparity information of the object may be wrong and the wrong depth information may be obtained. Then, the object is displayed with wrong depth, and the human may not see the object or see the object with deformation.

Therefore, when the stereo matching is performed between the two images with different views, how to obtain an accurate stereo matching result of each object in the two images has become a most important topic in the stereo matching technologies.

SUMMARY OF THE INVENTION

It is therefore an objective of the present invention to provide an image matching method and a stereo matching system capable of selecting an accurate stereo matching result according to an object characteristic of an image.

The present invention discloses an image matching method, for performing a stereo matching from a first image block to a second image block in a stereo matching system. The image matching method comprises performing a matching computation from the first image block to the second image block according to a first matching algorithm to generate a first matching result; performing the matching computation from the first image block to the second image block according to a second matching algorithm to generate a second matching result; performing the matching computation from the second image block to the first image block according to the second matching algorithm to generate a third matching result; obtaining a matching error of the first image block corresponding to the second matching algorithm according to the second matching result and the third matching result, and obtaining a matching similarity of the first image block matched to the second image block according to the second matching result; and determining a stereo matching result of the first image block as the first matching result or the second matching result according to the matching error and the matching similarity.

The present invention further discloses a stereo matching system for performing a stereo matching from a first image block to a second image block. The stereo matching system comprises a first matching module for performing a matching computation from the first image block to the second image block according to a first matching algorithm to generate a first matching result; a second matching module for performing the matching computation from the first image block to the second image block according to a second matching algorithm to generate a second matching result, performing the matching computation from the second image block to the first image block according to the second matching algorithm to generate a third matching result, obtaining a matching error of the first image block corresponding to the second matching algorithm according to the second matching result and the third matching result, and obtaining a matching similarity of the first image block matched to the second image block according to the second matching result; and a determination module for determining a stereo matching result of the first image block as the first matching result or the second matching result according to the matching error and the matching similarity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
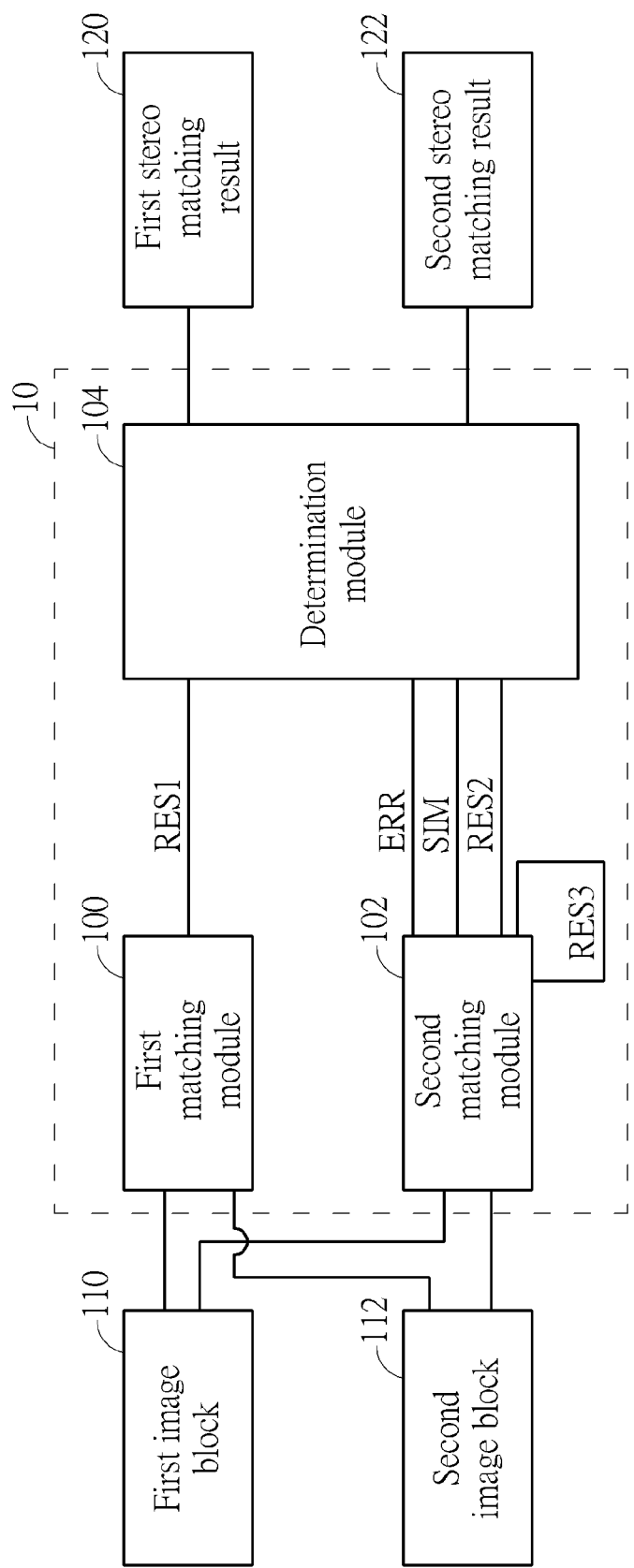
FIG. 1 is a schematic diagram of a stereo matching system according to an embodiment of the present invention.

Please refer to FIG. 1, which is a schematic diagram of a stereo matching system 10 according to an embodiment of the present invention. As shown in FIG. 1, the stereo matching system 10 includes a first matching module 100, a second matching module 102, and a determination module 104. The stereo matching system 10 may perform stereo matching between a first image block 110 and a second image block 112 to obtain disparity information of the first image block 110 and the second image block 112, i.e. a first stereo matching result 120 and a second stereo matching result 122.

In general, two images with different views corresponding to a captured object may be obtained by two image capture devices located at a left side and a right side of the captured object, and the two images are called a left-view image and a right-view image. When the left-view image and the right-view image are performed the stereo matching, for computing cost and complexity consideration, the left-view image and the right-view image are partitioned into small image blocks, and the stereo matching is performed on the small image blocks to obtain stereo matching results of the small image blocks. Finally, the stereo matching results of the small image blocks may be integrated into overall stereo matching results of the left-view image and the right-view image.

In FIG. 1, the first image block 110 and the second image block 112 may be regarded as the small image blocks of the left-view image and the right-view image, such as a scan line of the left-view image and a scan line of the right-view image, or a small region of the left-view image and a small region of the right-view image. The small regions of the left-view image and the right-view image may be square or rectangular regions composed of pixels. When the first image block 110 and the second image block 112 are two scan lines of the two images with different views, block sizes of the first image block 110 and the second image block 112 (i.e. a pixel number of the scan line) are not fixed, which may be adjusted according to computing time, computing cost, and results requirements. For example, when the pixel number of the scan line is large, the stereo matching system 10 may perform the stereo matching with larger pixels, that is, the stereo matching has larger search range and the matching result may be more accurate, but the computing time and cost relatively are increased.

Finally, the stereo matching system 10 generates the first stereo matching result 120 and the second stereo matching result 122, which include the disparity information. Depth information of the first image block 110 and the second image block 112 may be obtained by analyzing the disparity information for synthesizing the multi-views image blocks corresponding to the first image block 110 and the second image block 112. Then, the multi-views image blocks may be integrated to the multi-views image of the left-view image and the right-view image.

In detail, the first matching module 100, the second matching module 102, and the determination module 104 respectively may be implemented by an application specific integrated circuit (ASIC), or may be implemented by a processor and a storage device for storing a program code to indicates the processor to perform matching computation and determining. The storage device is a read-only memory (ROM), a random-access memory (RAM), a CD-ROM, a magnetic tape, a floppy disk, or an optical data storage device, etc, and is not limited herein.

First, the stereo matching system 10 performs the stereo matching from the first image block 110 to the second image block 112 to obtain the stereo matching result 120 of the first image block 110. Under such a condition, the first matching module 100 utilizes the first image block 110 as a source image block and the second image block 112 as a destination image block to perform matching search and disparity computation from the first image block 110 to the second image block 112 according to a first matching algorithm to obtain a first matching result RES1. The first matching result RES1 includes the disparity information of the first image block 110 corresponding to the first matching algorithm, and the first matching module 100 outputs the first matching result RES1 to the determination module 104.

Simultaneously, the second matching module 102 utilizes the first image block 110 as the source image block and the second image block 112 as the destination image block to perform the matching search and the disparity computation from the first image block 110 to the second image block 112 according to a second matching algorithm to obtain a second matching result RES2. The second matching result RES2 includes the disparity information of the first image block 110 corresponding to the second matching algorithm, and the second matching module 102 outputs the second matching result RES2 to the determination module 104. Furthermore, the second matching module 102 utilizes the first image block 110 as the destination image block and the second image block 112 as the source image block to perform the matching search and the disparity computation from the second image block 112 to the first image block 110 according to the second matching algorithm to obtain a third matching result RES3. The third matching result RES3 includes the disparity information of the second image block 112 corresponding to the second matching algorithm.

Thereby, the second matching module 102 may obtain a matching position in the second image block 112 from a representative point of the first image block 110 according to the disparity information of the first image block 110 in the second matching result RES2. The matching position in the second image block 112 is labeled as a matching point of the second image block 112. Moreover, the second matching module 102 may obtain a matching position in the first image block 110 from the matching point of the second image block 112 according to the disparity information of the second image block 112 in the third matching result RES3. The matching position in the first image block 110 is labeled as a verification point of the first image block 110. Next, the second matching module 102 computes a distance difference between the representative point and the verification point of the first image block 110 to obtain a matching error ERR for representing an error between the disparity information of the first image block 110 and the second image block 110 according to the second matching algorithm. Then, the second matching module 102 outputs the matching error ERR to the determination module 104.

In addition, the second matching module 102 may obtain all matching positions in the second image block 112 from all original points of the first image block 110 according to the disparity information of the first image block 110 in the second matching result RES2. The all matching positions in the second image block 112 are labeled as similar points of the second image block 112. Next, the second matching module 102 computes an overall similarity of pixel values between the original points of the first image block 110 and the similar points of the second image block 112 to obtain a matching similarity SIM. The second matching module 102 outputs the matching similarity SIM to the determination module 104.

Finally, the determination module 104 determines the first stereo matching result 120 according to the matching error ERR and the matching similarity SIM. When the matching error ERR is less than an error threshold and the matching similarity SIM is less than a similarity threshold, the determination module 104 determines the matching result of the first image block 110 corresponding to the second algorithm is reasonable, and the determination module 104 selects the second matching result RES2 as the first stereo matching result 120. When the matching error ERR is greater than the error threshold or the matching similarity SIM is greater than the similarity threshold, the determination module 104 determines the matching result of the first image block 110 corresponding to the second algorithm is not reasonable, and the determination module 104 selects the first matching result RES1 as the first stereo matching result 120. The error threshold and the similarity threshold may be adjusted according to a requirement and are not limited to generate the more accurate matching result.

After the stereo matching system 10 performs the stereo matching from the first image block 110 to the second image block 112 to obtain the first stereo matching result 120 of the first image block 110, the stereo matching system 10 similarly performs the stereo matching from the second image block 112 to the first image block 110 by the above matching computation to obtain the second stereo matching result 122 of the second image block 112. The second stereo matching result 122 includes the disparity information of the second image block 112.

As a result, for the two images with different views, which do not have the depth information, the stereo matching system 10 sequentially performs the stereo matching of individual image blocks in the two images and generates the stereo matching results of the individual image blocks. Furthermore, the stereo matching results of the individual image blocks may be integrated to the overall stereo matching results of the two images with different views, and the depth information of the two images with different views may be obtained according to the disparity information in the stereo matching results for synthesizing the multi-views images. Note that, the stereo matching system 10 utilizes the two different algorithms (the first matching algorithm and the second matching algorithm) to perform the stereo matching to obtain the two different stereo matching results. Therefore, the two different algorithms may be separately designed to be adapted to the matching computation of two different object characteristics of the image. After the stereo matching system 10 performs the stereo matching, the stereo matching system 10 may determine whether the matching result corresponding to one of the two different algorithms is reasonable to select the accurate stereo matching result. Thus, the stereo matching result of the stereo matching system 10 may be more accurate.

Noticeably, the implementing method of the first matching module 100 performing the stereo matching according to the first matching algorithm is not limited. Preferably, the first matching module 100 may perform the matching search and disparity computation from the first image block 110 to the second image block 112 according to a dynamic programming algorithm to obtain the first matching result RES1. According to the matching computation of the dynamic programming algorithm, the first image block 110 and the second image block 112 are performed matching search first to obtain respective matching states, and the matching states are converted to an disparity energy evaluation function, which is formed by a data item and a smooth item. A minimum energy value of the disparity energy evaluation function may be calculated by an algorithm to obtain the disparity information of each pixel in the first image block 110 and the second image block 112 (i.e. the disparity value of each pixel). In other word, the dynamic programming algorithm evaluates the accurate disparity information by the disparity energy evaluation function converted from the matching states between the first image block 110 and the second image block 112.

Figure 2:
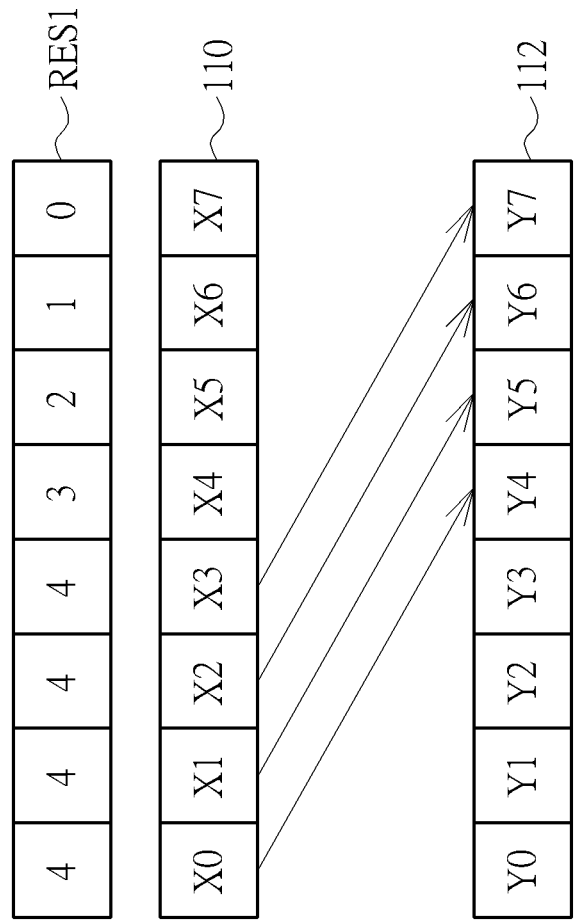
FIG. 2 is a schematic diagram of a first matching result of a first image block corresponding to a dynamic programming algorithm according to an embodiment of the present invention.

Please refer to FIG. 2, which is a schematic diagram of the first matching result RES1 of the first image block 110 corresponding to the dynamic programming algorithm according to an embodiment of the present invention. As shown in FIG. 2, the first image block 110 include pixels X0-X7, and the second image block 112 includes pixels Y0-Y7. In an embodiment, after performing the matching computation on the pixels X0-X7 of the first image block 110 according to the dynamic programming algorithm, the first matching result RES1 may be obtained and includes disparity values of the pixels X0-X7, which are 4, 4, 4, 4, 3, 2, 1, and 0. As can be seen, according to the disparity values of the pixels X0-X3 evaluated by the dynamic programming algorithm, the matching positions in the second image block 112 from the pixels X0-X3 of the first image block 110 are the positions of the pixels X0-X3 relative to 4 pixels, i.e. the pixels Y4-Y7 of the second image block 112 (such as arrow lines shown in FIG. 2). According to the disparity values of the pixels X4-X7 evaluated by the dynamic programming algorithm, the matching positions in the second image block 112 of the pixels X4-X7 of the first image block 110 are the positions of the pixels X4-X7 relative to 3 pixels, 2 pixels, 1 pixels, and 0 pixel, i.e. the pixel Y7 of the second image block 112.

Thereby, since the dynamic programming algorithm is designed according to a sequential correlation existing between the first image block 110 and the second image block 112, the dynamic programming algorithm not only calculates the minimum energy value of the disparity energy evaluation function by the algorithm to obtain the disparity information, the dynamic programming algorithm also obtains the disparity information according to the sequential correlation between the first image block 110 and the second image block 112. If the pixels X0-X3 are regarded as a large object having 4 pixels, since the disparity information evaluated by the dynamic programming algorithm has a sequential characteristic and the disparity information does not rapidly change, the pixels X0-X3 are integrally matched to the pixels Y0-Y4. Thus, the dynamic programming algorithm is adapted to the matching computation of the first image block 110 and the second image block 112 having a large object, and the disparity information evaluated by the dynamic programming algorithm has a stable characteristic.

Moreover, the implementing method of the second matching module 102 performing the stereo matching according to the second matching algorithm is also not limited. Preferably, the second matching module 102 may perform the matching search and the disparity computation between the first image block 110 and the second image block 112 according to a scan-line optimization algorithm to obtain the second matching result RES2 and the third matching result RES3. According to the matching computation of the scan-line optimization algorithm, the matching search of the first image block 110 and the second image block 112 is performed first to obtain respective matching states, and the matching states are converted to the disparity energy evaluation function. A minimum energy value of the disparity energy evaluation function may be calculated by an algorithm to obtain the disparity information of each pixel in the first image block 110 and the second image block 112. Compared with the dynamic programming algorithm, the scan-line optimization algorithm is designed according to a sequential correlation not existing between the first image block 110 and the second image block 112. The scan-line optimization algorithm simply calculates the minimum energy value of the disparity energy evaluation function to obtain the disparity information and does not have related limitations.

Figure 3:
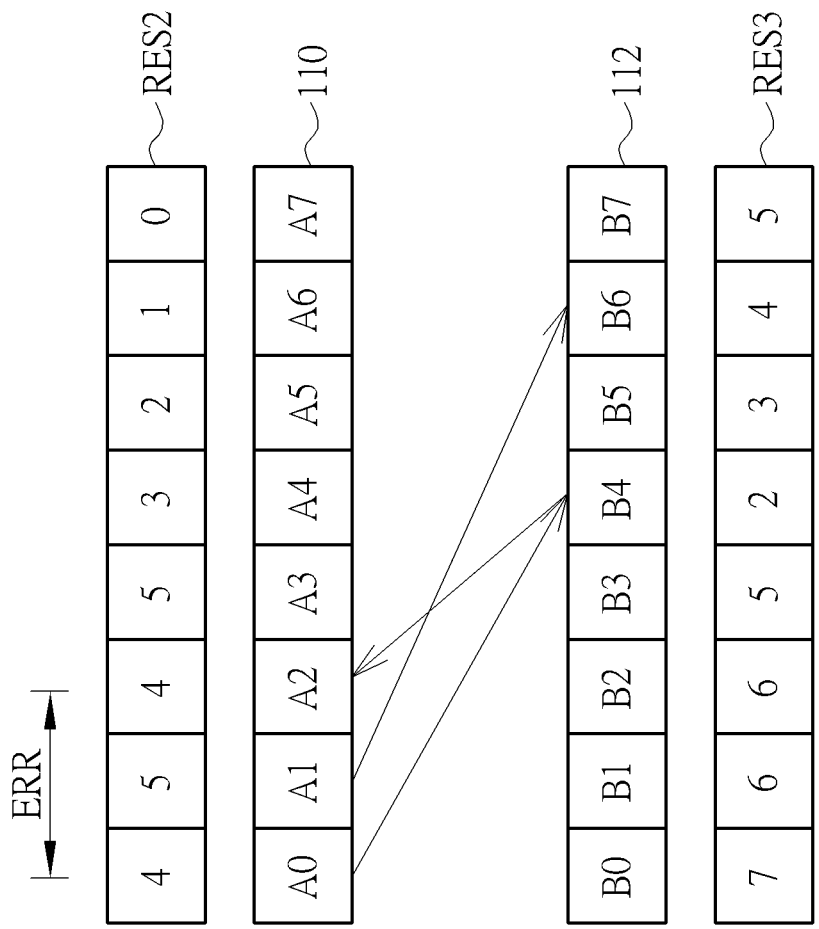
FIG. 3 is a schematic diagram of a second matching result of a first image block and a third matching result of a second image block corresponding to a scan-line optimization algorithm according to an embodiment of the present invention.

Please refer to FIG. 3, which is a schematic diagram of the second matching result RES2 of the first image block 110 and the third matching result RES3 of the second image block 112 corresponding to the scan-line optimization algorithm according to an embodiment of the present invention. As shown in FIG. 3, the first image block 110 include pixels A0-A7, and the second image block 112 includes pixels B0-B7. In an embodiment, after performing the matching computation on the pixels A0-A7 of the first image block 110 according to the scan-line optimization algorithm, the second matching result RES2 may be obtained and includes the disparity values of the pixels A0-A7, which are 4, 5, 4, 5, 3, 2, 1, 0. After performing the matching computation on the pixels B0-B7 of the second image block 112 according to the scan-line optimization algorithm, the third matching result RES3 may be obtained and includes the disparity values of the pixels B0-B7, which are 7, 6, 6, 5, 2, 3, 4, and 5.

Furthermore, if the pixel A0 is regarded as the representative point of the first image block 110, since the disparity value of the pixels X0 is 4, the matching positions in the second image block 112 from the pixel A0 of the first image block 110 is the position of the pixel A0 relative to 4 pixels, i.e. the pixel B4 of the second image block 112. On the other side, since the disparity value of the pixels B4 of the second image block 112 evaluated by the scan-line optimization algorithm is 2, the matching positions in the first image block 110 from the pixel B4 of the second image block 112 is the position of the pixel B4 relative to 2 pixels, i.e. the pixel A2 of the first image block 110. As can be seen, the second matching module 102 performs the matching computation from the first image block 110 to the second image block 112 and from the second image block 112 to the first image block 110 according to the scan-line optimization algorithm to obtain the pixel B4 of the second image block 112 matched from the pixel A0 of the first image block 110 and the pixel A2 of the first image block 110 matched from the pixel B4 of the second image block 112. Thus, the matching error ERR of the first image block 110 may be obtained by computing the distance difference between the pixel A0 and the pixel A2 (i.e. 2 pixels) in the first image block 110.

Simultaneously, the second matching module 102 may obtain the matching positions in the second image block 112 from the pixels A0-A7 of the first image block 110 according to the disparity values of the pixels A0-A7, and the second matching module 102 respectively computes absolute pixel value differences between the pixels A0-A7 and the corresponding matching positions in the second image block 112 to obtain similarities of the pixels A0-A7. Then, the second matching module 102 sums the similarities of the pixels A0-A7 to obtain the matching similarity SIM of the first image block 110 matched to the second image block 112.

Thereby, since the scan-line optimization algorithm is designed according to a sequential correlation not existing between the first image block 110 and the second image block 112, the scan-line optimization algorithm simply calculates the minimum energy value of the disparity energy evaluation function by the algorithm to obtain the disparity information, and the evaluated disparity information does not have a sequential characteristic and may rapidly change. For example, the matching position in the second image block 112 from the pixel A0 of the first image block 110 is the pixel B4, and the matching position in the second image block 112 from the pixel A1 of the first image block 110 is the pixel B6. As can be seen, the pixel B4 and the pixel B6 are not continuous as the pixels A0-A1. Thus, the scan-line optimization algorithm is adapted to the matching computation of the first image block 110 and the second image block 112 having a small object, and the disparity information evaluated by the scan-line optimization algorithm has a rapidly changing characteristic.

As a result, the first matching module 100 may perform the matching computation adapted to the large object according to the dynamic programming algorithm, and the second matching module 102 may perform the matching computation adapted to the small object according to the scan-line optimization algorithm. Since the first matching module 100 is designed for the large object, when the first matching module 100 performs the matching computation of the two images with different views having a large object, the matching result is more stable and does not rapidly change. Additionally, since the second matching module 102 is designed for the small object, when the second matching module 102 performs the matching computation of the two images with different views having a small object, the matching result may include the rapidly changing disparity information for reflecting the small object.

Meanwhile, in order to prevent the disparity information generated from the second matching module 102 causing the wrong stereo matching result due to the rapidly changing characteristic, the second matching module 102 computes the matching error ERR and the matching similarity SIM. Then, when the matching error ERR is less than the error threshold and the matching similarity SIM is less than the similarity threshold, the determination module 104 determines the matching result of the first image block 110 corresponding to the scan-line optimization algorithm is reasonable, and the determination module 104 selects the second matching result RES2 as the first stereo matching result 120. When the matching error ERR is greater than the error threshold or the matching similarity SIM is greater than the similarity threshold, the determination module 104 determines the matching result of the first image block 110 corresponding to the scan-line optimization algorithm is not reasonable, and the determination module 104 selects the first matching result RES1 as the first stereo matching result 120. Therefore, since the matching result may be properly selected from the matching results evaluated by the two algorithms with different characteristics, the matching result may be more accurate.

Figure 4:
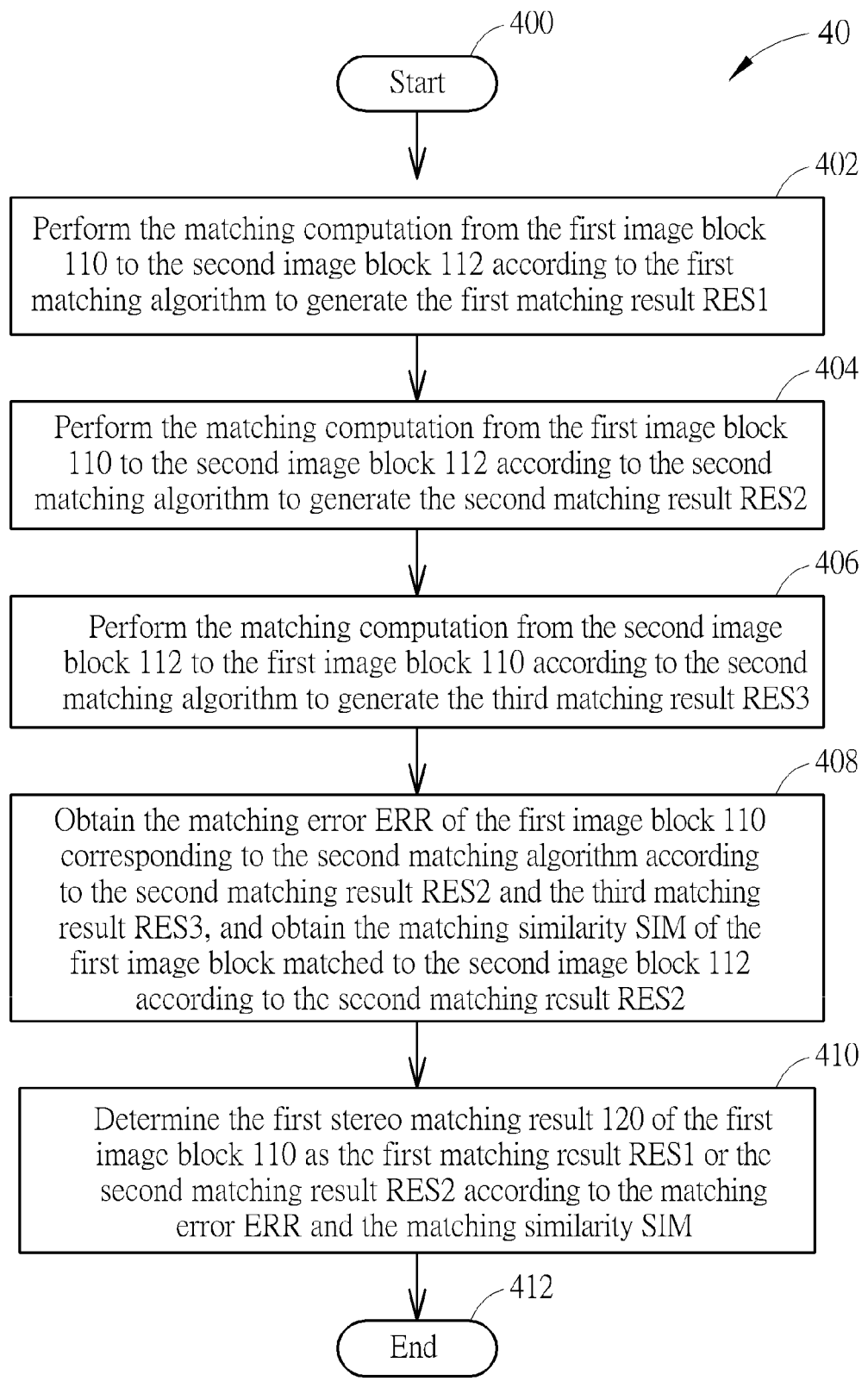
FIG. 4 is a schematic diagram of an image matching process according to an embodiment of the present invention.

The method for performing the stereo matching of the first image block 110 and the second image block 112 in the stereo matching system 10 to obtain the first stereo matching result 120 may be further summarized as an image matching process 40. As shown in FIG. 4, the image matching process 40 includes the following steps:

Step 400: start.

Step 402: perform the matching computation from the first image block 110 to the second image block 112 according to the first matching algorithm to generate the first matching result RES1.

Step 404: perform the matching computation from the first image block 110 to the second image block 112 according to the second matching algorithm to generate the second matching result RES2.

Step 406: perform the matching computation from the second image block 112 to the first image block 110 according to the second matching algorithm to generate the third matching result RES3.

Step 408: obtain the matching error ERR of the first image block 110 corresponding to the second matching algorithm according to the second matching result RES2 and the third matching result RES3, and obtain the matching similarity SIM of the first image block matched to the second image block 112 according to the second matching result RES2.

Step 410: determine the first stereo matching result 120 of the first image block 110 as the first matching result RES1 or the second matching result RES2 according to the matching error ERR and the matching similarity SIM.

Step 412: end.

The detail operations of each step in the image matching process 40 may be referred from the foregoing description of the embodiments, and will not be narrated hereinafter. Preferably, the proceeding sequence of the steps 402-408 may be adjusted according to actual requirements. For example, the steps 404-408 may processed first to obtain the matching result, the matching error, and the matching similarity of the first image block 110 corresponding to the second matching algorithm, and then the step 402 is processed to obtain the matching result of the first image block 110 corresponding to the first matching algorithm, which is also the scope of the present invention.

In addition, the image matching process 40 in the embodiment is utilized for the matching computation of the first image block 110 to obtain the first stereo matching result 120. However, the second stereo matching result 122 of the second image block 112 may also be obtained according to the image matching process 40. Similarly, the matching result of the second image block 112 is obtained according to the first matching algorithm, and the matching result, the matching error, and the matching similarity of the second image block 112 is obtained according to the second matching algorithm. Then, the second stereo matching result 122 is determined as the matching result evaluated by the first matching algorithm or the second matching algorithm according to the matching error and the matching similarity.

Specifically, according to an embodiment of the present invention, since the disparity information evaluated by the algorithm adapted to the small object may rapidly change, the stereo matching system performs the matching computation of the two image blocks according to the algorithm adapted to the small object (such as the scan-line optimization algorithm), and the stereo matching system obtains the matching error and the matching similarity according to the matching result for determining whether the matching result is reasonable. Those skilled in the art can make modifications or alterations accordingly. For example, in the embodiment, the second matching algorithm is the scan-line optimization algorithm. In other embodiment, the second matching algorithm may also be a belief propagation algorithm, which is also adapted to the small object.

Moreover, in the embodiment, the dynamic programming algorithm and the scan-line optimization algorithm obtain the disparity information by the matching search and the disparity energy evaluation function. In other embodiments, the dynamic programming algorithm and the scan-line optimization algorithm may also add other limitations or other computations and determinations to increase the accuracy of the disparity information. For example, the disparity information is accurately obtained according to the dynamic programming algorithm and the scan-line optimization algorithm limited on a temporal correlation or a spatial correlation between the two scan lines. Then, the matching error and the matching similarity may be calculated according to the accurate disparity information, so as to obtain the accurate matching result.

Furthermore, in the embodiment, the first stereo matching result 120 of the first image block 110 is first obtained by performing the stereo matching from the first image block 110 to the second image block 112, and then the second stereo matching result 122 of the second image block 112 is obtained by performing the stereo matching from the second image block 112 to the first image block 110. In other embodiments, the first stereo matching result 120 of the first image block 110 and the second stereo matching result 122 of the second image block 112 may also be simultaneously obtained by performing the stereo matching between the first image block 110 and the second image block 112, which is not limited.

In summary, in the prior art, single algorithm is utilized for performing the stereo matching of the two images with different views, and since landscapes of the two images are not entirely the same, the wrong disparity information may be obtained when the algorithm is not adapted to the object characteristic in the image, so as to affect the accuracy of the depth information. In comparison, the present invention utilizes the two different algorithms to perform the matching computation of the two images with different views, and the two different algorithms are adapted to the matching computations of the large object and the small object to obtain the two different matching results correspondingly. Thereby, the present invention may obtain the accurate matching result from the two different matching results by determining the matching error and the matching similarity corresponding to the algorithm having the rapidly changing disparity information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image matching method, for performing a stereo matching from a first image block to a second image block in a stereo matching system, the image matching method comprising:

performing a matching computation from the first image block to the second image block according to a first matching algorithm to generate a first matching result;

performing the matching computation from the first image block to the second image block according to a second matching algorithm to generate a second matching result;

performing the matching computation from the second image block to the first image block according to the second matching algorithm to generate a third matching result;

obtaining a matching error of the first image block corresponding to the second matching algorithm according to the second matching result and the third matching result, and obtaining a matching similarity of the first image block matched to the second image block according to the second matching result; and determining a stereo matching result of the first image block as the first matching result or the second matching result according to the matching error and the matching similarity.

2. The image matching method of claim 1, wherein the first image block and the second image block are two scan lines or two regions of an image.

3. The image matching method of claim 1, wherein the first matching algorithm is designed according to a sequential correlation existing between the first image block and the second image block, and the first matching algorithm is adapted to the matching computation of the first image block and the second image block having a large object.

4. The image matching method of claim 1, wherein the first matching algorithm performs the matching computation according to a dynamic programming algorithm.

5. The image matching method of claim 1, wherein the second matching algorithm is designed according to a sequential correlation not existing between the first image block and the second image block, and the second matching algorithm is adapted to the matching computation of the first image block and the second image block having a small object.

6. The image matching method of claim 1, wherein the second matching algorithm performs the matching computation according to a scan-line optimization algorithm.

7. The image matching method of claim 1, wherein the step of obtaining the matching error of the first image block corresponding to the second matching algorithm according to the second matching result and the third matching result comprises:

obtaining a matching point of the second image block matched from a representative point of the first image block according to the second matching result;

obtaining a verification point of the first image block matched from the matching point of the second image block according to the third matching result; and calculating a distance difference between the representative point and the verification point to obtain the matching error of the first image block corresponding to the second matching algorithm.

8. The image matching method of claim 1, wherein the step of obtaining the matching similarity of the first image block matched to the second image block according to the second matching result comprises:

obtaining at least one similar point of the second image block matched from at least one original point of the first image block according to the second matching result; and obtaining the matching similarity according to the at least one original point and the at least one similar point.

9. The image matching method of claim 8, wherein the matching similarity is a sum of at least one absolute pixel value difference between the at least one original point and the at least one similar point.

10. The image matching method of claim 1, wherein the step of determining the stereo matching result of the first image block as the first matching result or the second matching result according to the matching error and the matching similarity comprises:

determining the stereo matching result of the first image block as the second matching result when the matching error is less than an error threshold and the matching similarity is less than a similarity threshold, and determining the stereo matching result of the first image block as the first matching result when the matching error is greater than the error threshold or the matching similarity is greater than the similarity threshold.

11. The image matching method of claim 1, wherein the stereo matching result includes disparity information of the first image block matched to the second image block.

12. A stereo matching system, for performing a stereo matching from a first image block to a second image block, the stereo matching system comprising:

a first matching module for performing a matching computation from the first image block to the second image block according to a first matching algorithm to generate a first matching result;

a second matching module for performing the matching computation from the first image block to the second image block according to a second matching algorithm to generate a second matching result, performing the matching computation from the second image block to the first image block according to the second matching algorithm to generate a third matching result, obtaining a matching error of the first image block corresponding to the second matching algorithm according to the second matching result and the third matching result, and obtaining a matching similarity of the first image block matched to the second image block according to the second matching result; and a determination module for determining a stereo matching result of the first image block as the first matching result or the second matching result according to the matching error and the matching similarity.

13. The stereo matching system of claim 12, wherein the first image block and the second image block are two scan lines or two regions of an image.

14. The stereo matching system of claim 12, wherein the first matching algorithm is designed according to a sequential correlation existing between the first image block and the second image block, and the first matching algorithm is adapted to the matching computation of the first image block and the second image block having a large object.

15. The stereo matching system of claim 12, wherein the first matching algorithm performs the matching computation according to a dynamic programming algorithm.

16. The stereo matching system of claim 12, wherein the second matching algorithm is designed according to a sequential correlation not existing between the first image block and the second image block, and the second matching algorithm is adapted to the matching computation of the first image block and the second image block having a small object.

17. The stereo matching system of claim 12, wherein the second matching algorithm performs the matching computation according to a scan-line optimization algorithm.

18. The stereo matching system of claim 12, the step of obtaining the matching error of the first image block corresponding to the second matching algorithm according to the second matching result and the third matching result comprises:

obtaining a matching point of the second image block matched from a representative point of the first image block according to the second matching result;

obtaining a verification point of the first image block matched from the matching point of the second image block according to the third matching result; and calculating a distance difference between the representative point and the verification point to obtain the matching error of the first image block corresponding to the second matching algorithm.

19. The stereo matching system of claim 12, wherein the step of obtaining the matching similarity of the first image block matched to the second image block according to the second matching result comprises:
  obtaining at least one similar point of the second image block matched from at least one original point of the first image block according to the second matching result; and
  obtaining the matching similarity according to the at least one original point and the at least one similar point.

20. The stereo matching system of claim 19, wherein the matching similarity is a sum of at least one absolute pixel value difference between the at least one original point and the at least one similar point.

21. The stereo matching system of claim 12, wherein the step of determining the stereo matching result of the first image block as the first matching result or the second matching result according to the matching error and the matching similarity comprises:
  determining the stereo matching result of the first image block as the second matching result when the matching error is less than an error threshold and the matching similarity is less than a similarity threshold, and determining the stereo matching result of the first image block as the first matching result when the matching error is greater than the error threshold or the matching similarity is greater than the similarity threshold.

22. The stereo matching system of claim 12, wherein the stereo matching result includes disparity information of the first image block matched to the second image block.

* * * * *